3,138,523
METHOD OF PROTECTING AGAINST ARACHNIDS WITH N-(3-NITROPHENYL)ITACONIMIDE

Bogislav von Schmeling, Hamden, Conn., assignor to United States Rubber Company, New York, N.Y., a corporation of New Jersey
No Drawing. Filed Apr. 6, 1962, Ser. No. 185,532
1 Claim. (Cl. 167—33)

This invention relates to improvements in protecting fruit bearing trees, and foliage and fruit growing thereon, against damage by arachnids.

I have found that N-(3-nitrophenyl)itaconimide is effective to control arachnids, i.e. mites, on fruit trees. The N-(3-nitrophenyl)itaconimide is applied to the trees by spraying the trees, generally intermittently from the appearance of foliage throughout the fruit growing season, with aqueous suspensions of the N-(3-nitrophenyl)-itaconimide. The aqueous suspensions of the chemical may be prepared with the aid of surface-active dispersing agents which may be any of the conventional anionic, non-ionic or cationic surface-active agents. Such surface-active agents are well known and reference is made to U.S. Patent No. 2,547,724, columns 3 and 4, for detailed examples of the same. Fruit trees are commonly infested with a variety of mites. The major destructive mites of deciduous fruit trees including apple, pear, plum, prune, cherry, peach, nectarine and apricot trees are clover spider mite, *Bryobia praetiosa* Koch; European red spider mite, *Paratetranychus pilosus* (Canestrini and Fanzago); two-spotted spider mite, *Tetranychus telarius* (L.); Pacific spider mite, *Tetranychus pacificus* McGregor; and McDaniel spider mite, *Tetranychus mcdanieli* McGregor. The major destructive mites of citrus fruit trees including orange, grapefruit, lemon, lime and tangerine trees are the citrus rust mite, *Phyllocoptruta oleivora* (Aschm.); the citrus red mite, known as the purple mite in Florida, *Panonychus citri* (McG.); Texas citrus mite, *Eutetranychus banski* (McG.); and six-spotted mite, *Eotetranychus sexmaculatus* (Riley). The fruit trees, and the fruit and foliage thereon, are protected against damage by such acarids by spraying the trees with an aqueous suspension of the N-(3-nitrophenyl)itaconimide which suppresses the mite population.

The following example illustrates the invention. Aqueous suspensions of approximately 0.1% and 0.2% by weight of N-(3-nitrophenyl)itaconimide were prepared with approximately 2 parts by weight of a mixture of surface-active agent, viz. approximately 1 part of a non-ionic surface-active alkyl anyl polyether alcohol and approximately 1 part of an anionic surface-active condensation product of sodium naphthalene sulfonate and formaldehyde per 100 parts of the N-(3-nitrophenyl)itaconimide. During the period April 26 to August 10, i.e., from the appearance of foliage throughout the fruit growing season, in an orchard in Connecticut, at seven to ten day intervals, two 12-year old McIntosh apple trees were sprayed with the 0.1% aqueous suspension of the N-(3-nitrophenyl)itaconimide and two apple trees were sprayed with the 0.2% aqueous suspension of the N-(3-nitrophenyl)itaconimide. Three control apple trees in the test plot in the orchard were not treated with the N-(3-nitrophenyl)itaconimide. In the period April 26 to August 10, there was a total of 13 sprays with approximately five gallons of spray per application to each treated tree. On August 14, and again on September 12 at harvest, observations showed that the population of the two-spotted spider mite, *Tetranychus telarius* (L.), and the European red mite, *Paratetranychus pilosus* (Canestrini and Fanzango), on the trees treated with the N-(3-nitrophenyl)itaconimide was considerably suppressed compared to the untreated check trees. While the foliage of the untreated check trees was brown, the trees treated with the N-(3-nitrophenyl)itaconimide still had green foliage. The mites had done at least 50% less damage to the foliage of the trees treated with the N-(3-nitrophenyl)itaconimide than to the untreated foliage.

Having thus described my invention, what I claim and desire to protect by Letters Patent is:

The method of protecting fruit bearing trees, and foliage and fruit growing thereon, against damage by arachnids which comprises spraying fruit bearing trees with an aqueous suspension of N-(3-nitrophenyl)itaconimide.

References Cited in the file of this patent
UNITED STATES PATENTS

| | | |
|---|---|---|
| 2,521,720 | Hill | Sept. 12, 1950 |
| 2,726,981 | Wolf et al. | Dec. 13, 1955 |
| 2,757,119 | Bennett et al. | July 31, 1956 |
| 2,989,436 | O'Brien et al. | June 20, 1961 |
| 3,004,036 | Fan et al. | Oct. 10, 1961 |